United States Patent [19]

Cipriani et al.

[11] Patent Number: 4,812,499

[45] Date of Patent: Mar. 14, 1989

[54] SELF-EXTINGUISHING COMPOSITIONS OF THERMOPLASTIC POLYMERS

[75] Inventors: Gioacchino Cipriani, San Donato Milanese; Gianluigi Landoni, Milan, both of Italy

[73] Assignee: Enichem Sintesi S.p.A., Palermo, Italy

[21] Appl. No.: 841,591

[22] Filed: Mar. 20, 1986

[30] Foreign Application Priority Data

Mar. 29, 1985 [IT] Italy .............................. 20155 A/85

[51] Int. Cl.[4] ........................ C08K 13/02; C08K 3/32; C08K 5/51; C08L 23/02

[52] U.S. Cl. ........................................ 524/96; 524/97; 524/99; 524/100; 524/102; 524/103; 524/104; 524/105; 524/106; 524/139; 524/140; 524/145; 524/148; 524/416; 524/502; 524/555

[58] Field of Search ..................... 524/96, 97, 99, 100, 524/102, 103, 104, 105, 106, 139, 148, 416, 502, 555, 140, 145

[56] References Cited

U.S. PATENT DOCUMENTS

| | | | |
|---|---|---|---|
| 3,892,765 | 7/1975 | Porret et al. | 524/105 |
| 3,946,034 | 3/1976 | Porret et al. | 524/106 |
| 3,978,076 | 8/1976 | Porret et al. | 524/106 |
| 3,994,858 | 11/1976 | Porret et al. | 524/106 |
| 4,093,809 | 6/1978 | Hall et al. | 524/106 |
| 4,145,510 | 3/1979 | Hall et al. | 524/106 |
| 4,198,493 | 8/1980 | Marciandi | 524/416 |
| 4,199,494 | 4/1980 | Moser et al. | 524/97 |
| 4,336,182 | 6/1982 | Landoni et al. | 524/502 |
| 4,435,533 | 3/1984 | Tsolis et al. | 524/106 |
| 4,579,894 | 4/1986 | Bertelli et al. | 524/416 |
| 4,661,594 | 4/1987 | Rasberger et al. | 524/106 |

FOREIGN PATENT DOCUMENTS

| | | | |
|---|---|---|---|
| 146464 | 2/1981 | Fed. Rep. of Germany | 524/148 |
| 523121 | 7/1976 | U.S.S.R. | 524/148 |

*Primary Examiner*—Kriellion Morgan

*Attorney, Agent, or Firm*—Hedman, Gibson, Costigan & Hoare

[57] ABSTRACT

Compositions of thermoplastic polymers comprising, in mixture, a thermoplastic polymer and a mixture of self-extinguishability-conferring additives, formed by: ammonium phosphate or ammonium polyphosphate:

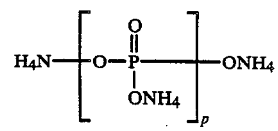

(I)

(wherein p is preferably equal to or greater than 50); phosphorus-containing compound definable by means of the general formula:

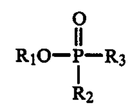

(IIa)

or

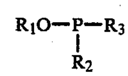

(IIb)

(wherein $R_1$, $R_2$ and $R_3$ have the meaning as indicated in the disclosure).

7 Claims, No Drawings

SELF-EXTINGUISHING COMPOSITIONS OF THERMOPLASTIC POLYMERS

The present invention relates to self-extinguishing thermoplastic polymers comprising, in mixture, a thermoplastic polymer and a mixture of additives capable of conferring self-extinguishability characteristics on the same thermoplastic polymer.

In the art the need is increasingly felt for having available polymeric compositions provided with high self-extinguishing characteristics, for safety reasons. Thus, according to the known art, characteristics of self-extinguishability can be conferred on thermoplastic polymers by incorporating into the same polymers metal compounds, especially compounds of antimony, bismuth or arsenic, in combination with halogenated organic compounds, such as chlorinated paraffins. Polymeric compositions are thus obtained which, although they are generally satisfactory for their self-extinguishing characteristics, are disadvantageous for their corrosiveness during their processing and forming, and due to the emission of darkening smokes and toxic fumes in case of fire during their storage or use. Moreover, the amounts to be added of such additives, in order to obtain high self-extinguishing values (V-0 according to the Underwriters Laboratories, Inc.; Bulletin 94, Standard UL-94) are typically on the order of magnitude of about 40% by weight, so as to notably impair the physical-mechanical and light stability characteristics of the polymers they are incorporated in.

In the art, other self-extinguishing, halogen-free additives have been proposed, such as disclosed, e.g., in U.S. Pat. Nos. 4,009,207 and 4,010,137, which additives are capable of conferring V-0 self-extinguishability values, according to the said UL-94 Standard, at lower concentrations, typically on the order of 25% by weight, and hence impairing to a lesser extent the characteristics of the polymers they are incorporated in. Moreover, these additives, of the type known as "char-forming," involve, in case of a fire, a considerable reduction of the darkening smokes and of the toxic and corrosive fumes, as compared to the halogenated additives.

These additives have shown however not to be completely satisfactory in at least one of the following aspects: thermal stability under the conditions of moulding of the polymers they are incorporated in, with consequent possibility of the appearance of undesired colourings and evolution of gases and fumes; stability over time; concentration required to obtain the desired self-extinguishability effect; and cost.

It has now been found that the disadvantages of the known art can be overcome, or at least greatly reduced, by means of a mixture of self-extinguishing additives for the thermoplastic polymers.

Accordingly, the present invention relates to self-extinguishing compositions of thermoplastic polymers comprising, in mixture, a thermoplastic polymer and a mixture of additives conferring self-extinguishing characteristics to the same polymer, formed by:

ammonium phosphate or ammonium polyphosphate:

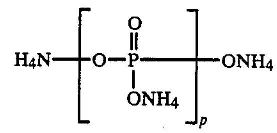
(I)

(wherein p varies within the range of from 1 to about 1000); and by:

phosphorus-containing compound definable by means of the general formulae:

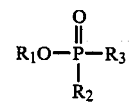
(IIa)

or

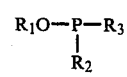
(IIb)

wherein $R_1$ is a group which can be represented by the following formula:

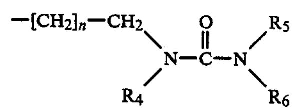
(c)

or a group which can be represented by the following formula:

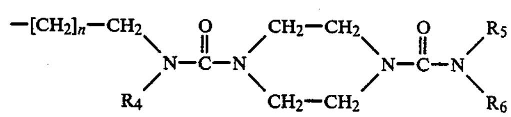
(d)

wherein, in said (c) and (d) formulae, n varies within the range of from 1 to 5;

$R_4$, $R_5$, $R_6$ can be independently selected among hydrogen (up to a maximum of two hydrogen atoms), and $C_2$-$C_6$ alkyl or $C_2$-$C_6$ hydroxyalkylene groups; or $R_5$ and $R_6$, in (c) and (d) formulae, or $R_4$ and $R_6$ in the (c) formula only, when considered jointly, can form a $—(CH_2)_m—$ alkylene bridge, wherein m has such a value as to give rise to the formation of five-, or six-membered ring structures, or $R_5$ and $R_6$, when considered jointly, can form a $—CH_2—CH_2—O—CH_2—CH_2—$ oxydiethylene bridge;

$R_2$ and $R_3$ can be equal to $—OR_1$; or they can be selected among the following groups:

$—OH$ $—O^-NH_4^+$

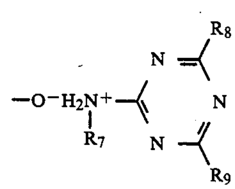
(e)

-continued (f)

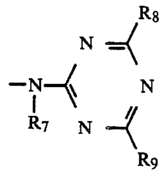

wherein in said (e) and (f) formulae:

$R_7$ is either hydrogen or a $C_1$–$C_6$ alkyl group;

$R_8$ and $R_9$ are groups independently selected among amino, hydroxy, $C_1$–$C_6$ alkyl, $C_1$–$C_6$ oxyalkyl and $C_1$–$C_6$ mono- and di-amino-alkyl group;

the additives (I) and (IIa) and/or (IIb) can moreover be present in overall amounts of from 20 to 35 parts by weight per each 100 parts by weight of thermoplastic polymer, the weight ratio between the additive (I) and the additive (IIa) and/or the additive (IIb) can moreover vary within the range of from 0.45/1 to 3.5/1 and preferably within the range of from 0.8/1 to 2.0/1.

The thermoplastic polymers to which the self-extinguishability characteristics are conferred are generally those belonging to the following polymer classes: olefinic polymers, acrylonitrile-butadiene-styrene polymers, polyesters such as polyethylene terephthalate and polybutylene terephthalate and polyurethane. Among these polymers, for the purposes of the present invention, polypropylene and low- and high-density polyethylene are preferred.

The additive (I) of the present invention is preferably an ammonium polyphosphate, as defined by the foregoing formula (I), wherein the value of p varies within the range of from about 50 to about 1000. The products in question are commercially available, as, e.g., the commercial product EXOLIT® 422 by Hoechst, and the commercial product PHOS CHECK® P-30 by Monsanto.

The additives (IIa) and (IIb) of the present invention are phosphorus-containing compounds defined by means of the previously reported (IIa) and (IIb) formulae. Preferred compounds are those definable by means of said formulae, wherein the substituent $R_1$ is selected from the following groups:

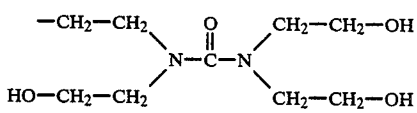

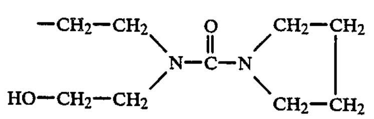

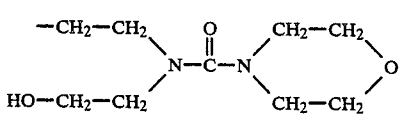

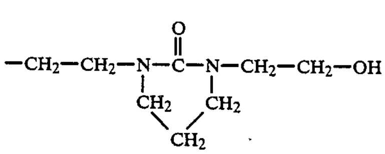

-continued

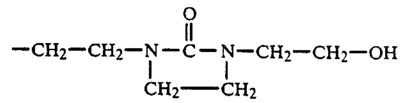

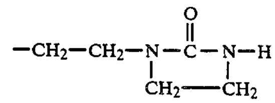

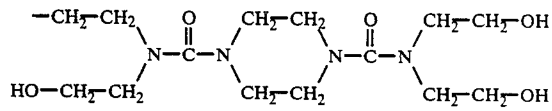

The stabilizer additives (IIa) and (IIb) of the present invention can give rise to condensation products, e.g., by heating at temperatures higher than room temperatures, with the formation of products with higher molecular weight.

Said condensation reactions are also due to the presence in the additives (IIa) and (IIb) of reactive functional groups.

The condensation products of such additives maintain unchanged the self-extinguishability characteristics conferred on the thermoplastic polymers they are incorporated in, and exert on said polymers a plastifying or filling effect, and that as a function of the condensation degree conferred on the same additives. Hence, according to another aspect thereof, the present invention relates to polymeric compositions, containing, in mixture, a thermoplastic polymer and a mixture formed by the additive (I) and the products deriving from the condensation of (IIa) and/or (IIb) additives, said condensation products being obtained outside the thermoplastic polymer or inside the same polymer, during the processing and forming steps carried out at temperatures higher than room temperatures.

The compounds with formulae (IIa) and (IIb) can be prepared starting from compounds $R_1OH$ (wherein $R_1$ has the hereinabove indicated meaning), obtained in their turn by condensation between aminoalcohols and carbonyl compounds (e.g., urea), by operating in mass at temperatures comprised within the range of from 150° to 200° C.

For instance:

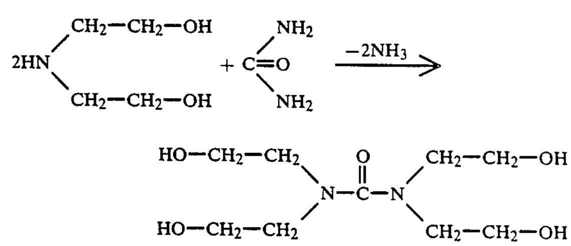

The compounds (IIa) and (IIb) can hence be prepared by means of the reaction of the compound $R_1OH$ with $POCl_3$ or $PCl_3$ respectively, and subsequent hydrolysis in aqueous medium; the phosphoric or phosphorous ester deriving therefrom can be then treated with melamine to yield the corresponding salt.

For instance:

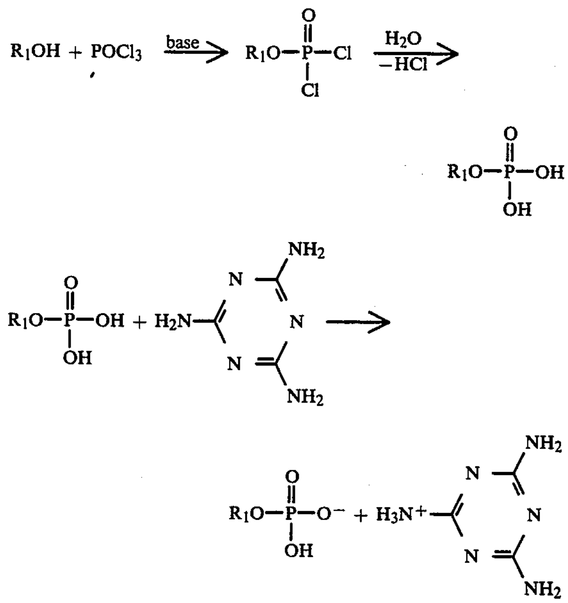

as an alternative, the phosphoric esters of $R_1OH$ can be obtained by thermal condensation between $R_1OH$ and phosphoric acid, or polyphosphoric acid, at temperatures on the order of 80°–120° C. By subsequent addition of the triazine, the corresponding salt of the amine is obtained, which, by dehydration, can give rise to the amido derivative.

For instance:

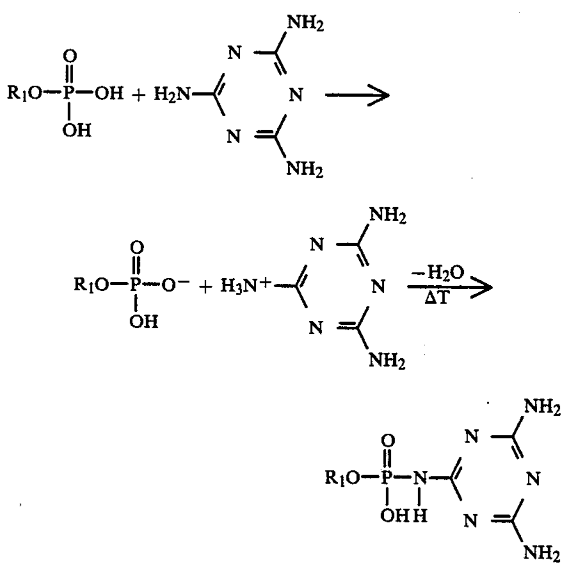

The self-extinguishing compositions of thermoplastic polymers of the present invention are prepared by any means known in the art, and it is suitable to homogenize the additives with the polymer. According to common practice, the additives are submitted to milling to reduce them to a powder with particle sizes comprised within the range of from 0,5 to 70μ. The so-obtained powder is blended with the thermoplastic polymer and the blend is extruded, a granulated self-extinguishing composition of thermoplastic polymer being obtained. The mixture of the self-extinguishing additives of the present invention is capable of conferring to the thermoplastic polymer into which it is incorporated, high self-extinguishability characteristics (classifiable as V-0 according to the UL-94 Standard) and high values of LOI (Limiting Oxygen Index-ASTM D 2863-77 Standard), when said additives are used in the overall amounts and in the relative proportions which have been previously indicated.

It should be noted that under these conditions, the mixture of the additives does not cause noticeable changes in the typical properties of the thermoplastic polymer it is incorporated in.

It should be finally observed that the self-extinguishability characteristics conferred to the thermoplastic polymers by the mixture of additives are surprisingly good, in particular as compared to the effect exerted by the individual additives (I) and (IIa) and/or (IIb), as it shall clearly appear from the experimental Examples.

In the following experimental Examples, reported to illustrate and not to limit the invention, the polypropylene used is available from the market under the trade name MOPLEN® FL F20 by Montedison, having a melt-flow index of about 12 g/10′, as measured according to ASTM D 1238 Standard.

To this polypropylene, 0.7% by weight is added of a stabilizer system formed by 66 parts by weight of dilauryl-thiopropanoate and 33 parts by weight of pentaerithritol tetra 3-(3,5-di-tert.butyl-4-hydroxyphenyl)-propanoate.

The self-extinguishing additives are homogenized by milling up to a powder with average particle size of about 50μ, and the so-obtained powder is blended and homogenized with polypropylene powder. The blend is then introduced into an extruder within the temperature range of from 200° to 240° C., and the extrudate is cooled and granulated. The so-obtained granules are both compression-moulded (190°–250° C.; 40 kg/cm$^2$), and injection-moulded (200°–250° C.), to respectively obtain two types of specimens:

A specimen: dimensions (127×12.7×3.2) mm;

B specimen: dimensions (127×6.5×3.2) mm.

The A specimens are submitted to the test of fire performance according to UL-94 Standard. According to this Standard, the materials receive a V-0, V-1 and V-2 classification, on the basis of the results obtained on five specimens.

The B specimens are submitted to the tests of fire performance according to the ASTM D 2863-77 Standard, correlating the flammability of a polymeric material to the concentration by volume of oxygen present in the atmosphere under which the same specimen is placed. This correlation is expressed as LOI (Limiting Oxygen Index), i.e., as the minimum percentage of oxygen capable of supporting the combustion of the specimen under an oxygen-nitrogen atmosphere impinging against the specimen flowing from down upwards.

EXAMPLE 1

200 g (1.92 mol) of N-(2-aminoethyl)-ethanolamine (99%) are mixed with 115.2 g (1.92 mol) of urea in a 1-liter, 4-neck flask, equipped with condenser, thermometer, mechanical stirrer and nitrogen inlet.

By operating under a nitrogen atmosphere, the temperature of the mixture is increased up to 200° C. during a 1-hour time, and is maintained at that value for four hours. Ammonia is evolved, which is absorbed in water. At the end of ammonia evolvement, the yellow-coloured solution is cooled to 50° C., and to it an equal volume of tetrahydrofuran is added. The product crystallizes nearly at once by cooling to room temperature. The whole is then cooled to 5°-10° C. to increase the crystallization yield, and is filtered at such temperature under nitrogen. The crystallized product is washed with cool tetrahydrofuran. A white crystalline product is obtained (225 g; yield about 90%), of hygroscopic character. The elemental and spectral (I.R.; N.M.R.) analyses are in accordance with the structure:

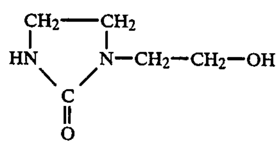

EXAMPLE 2

The process is carried out similarly to Example 1, using diethanolamine, to prepare the ureic compound:

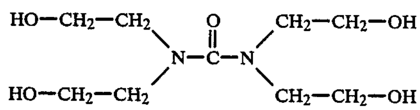

In particular, 105 g (1.0 mol) of diethanolamine are treated with 30 g (0.5 mol) of urea at 180°-200° C., under a nitrogen atmosphere. The reaction mixture is distilled under high vacuum, to give 74 g (yield 63%) of a product boiling at 140° C./0.1 $mm_{Hg}$.

The elemental analysis and the spectral (I.R.; N.M.R.) analyses confirm the above indicated structure.

EXAMPLE 3

1-Hydroxyethyl-imidazolidin-2-one (30 g; 0.23 mol), prepared by thermal condensation of N-(2-aminoethyl-)ethanolamine with urea, is reacted with urea phosphate (18.2 g; 0.115 mol), operating under a nitrogen atmosphere at 140° C. and for 2 hours, inside a glass flask equipped with mechanical stirrer, an inert gas inlet and an outlet for the gas evolved. During this time period the evolvement occurs of carbon dioxide and ammonia. To the reaction mixture, urea (6.90 g; 0.115 mol) is then added, and the temperature is slowly increased, during a 1-hour time, up to 180° C. and is kept at this value for the subsequent two hours. At the end of this last time period, no gas is any longer evolved, and the reaction mixture is cooled to room temperature, causing the solidification thereof, and the so obtained solid product is ground to a powder form.

The (IIa) additive is so obtained, which, on the basis of I.R., N.M.R. and elemental analyses is in accordance with the following structure:

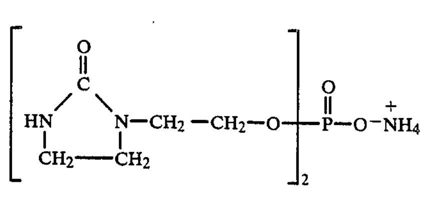

This compound shows, at the thermogravimetric analysis, a $T_{2\%}$ value of 215° C., wherein $T_{2\%}$ indicates a 2% weight loss at the temperature T shown.

EXAMPLE 4

The additive (IIa) of Example 3 can be alternatively prepared by means of the following procedure.

0.2 mol (13.0 g) of 2-hydroxyethyl-imidazolidin-2-one

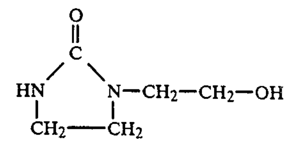

dissolved in 50 ml of methylene chloride are added under an inert atmosphere and during a 1-hour time to 0.1 mol (15.3 g) of $POCl_3$, in its turn dissolved in 50 ml of methylene chloride, in the presence of 2 mol (20.5 g) of triethylamine, at the temperature of −20° C. After 1 hour from the time of the addition, and always maintaining the temperature at −20° C., the amine hydrochloride is filtered off, methylene chloride is evaporated off, and 33.5 g are obtained of a very thick residue, corresponding to the phosphohydrochloride of structure:

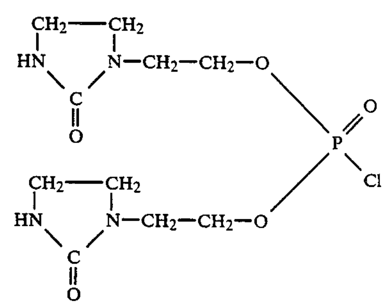

(Cl: 10.5% by weight; N: 16.0 by weight).

This compound is hydrolyzed at 2° C. with an aqueous solution of ammonia (about 10% by weight). The solution is evaporated to dryness, operating at a temperature lower than 40° C., and the dry product is separated from ammonium chloride by extraction with methanol. The product obtained, as a white powder (24.4 g; yield 72%) corresponds to the formula:

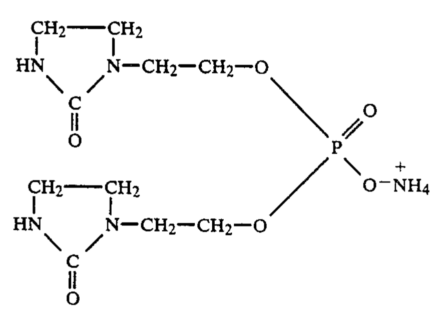

on the basis of spectral (I.R. and N.M.R.) evidences and of the results of the elemental analysis (N: 20% by weight; P: 8.8% by weight).

EXAMPLE 5

Polyphosphoric acid (85% by weight of $P_2O_5$; 11.4 g) is reacted with the compound

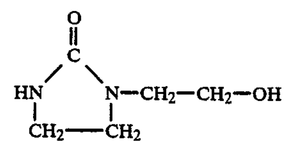

(17.8 g; 0.136 mol), by operating three hours at 120° C.

28.1 g (yield 97.1%) are obtained of a reaction product which, on the basis of the potentiometric analysis (titration with NaOH) displays the behaviour of a dibasic acid, with equivalent weight 106.5, in accordance with the structure:

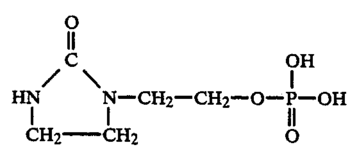

25 g of this compound are treated in aqueous solution, at low temperature (5° C.) with 15.0 g of melamine, added as small portions. After 5 hours, a white crystalline powder is filtered off, and is repeatedly washed with water. The product is dried, and 30.3 g are weighed (yield about 75%).

Spectral evidences (I.R.: strong band within the range $\nu=1050$–$1150\ cm^{-1}$), and the elemental analysis are in accordance with the structure:

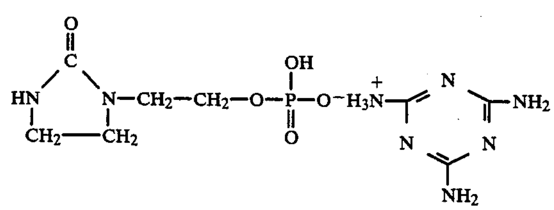

EXAMPLE 6

To the additive obtained as shown at Example 3 (73 g; 0.21 mol) melamine (26.6 g; 0.21 mol) is added, and the mixture is thoroughly mixed under an inert atmosphere inside a 500-ml glass reactor, immersed in a silicone oil bath at the temperature of 180° C. The mixture, of resinous appearance, is kept stirred at this temperature for 2 hours, after which the temperature is increased up to 250° C. After further four hours of reaction, the evolution of gas (ammonia and water vapour) ends.

On cooling, 83 g are recovered of product, the elemental analysis of which is substantially in agreement with the structure:

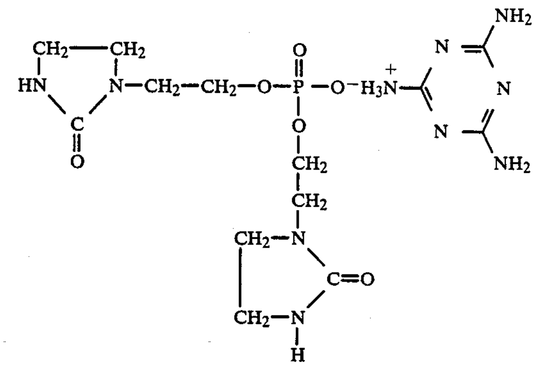

(N: 30.2% by weight; P: 6.5% by weight).

However, for the product in question, together with the above-reported structure, the existence can be likely conjectured of species derived from it either by elimination of intramolecular water and/or by intermolecular condensations. The existence of these species confers a much lower solubility to the product in question.

EXAMPLE 7

The additive of Example 6 is obtained by means of the following alternative procedure.

1-Hydroxyethyl-imidazolidin-2-one (100 g; 0.76 mol) is mixed with melamine phosphate (85 g; 0.38 mol) and with urea (45.6 g; 0.76 mol) in a 500-ml glass reactor.

The mixture is heated under stirring and under inert atmosphere at 150° C. for 6 hours and at 180° C. for 3 hours. The temperature is then increased up to 250° C. and the reaction is continued for further 4 hours, after which the evolution of ammonia and carbon dioxide ends. The recovered reaction product (about 130 g) is substantially analogous to that obtained at Example 6, on the basis of the elemental analysis.

EXAMPLE 8

By following the procedure as described in the patent specification, a mixture is prepared containing polypropylene (76.5% by weight), additive (IIa) of Example 1 (9% by weight) and commercial ammonium polyphosphate PHOS CHECK® P30 by Monsanto, corresponding to the additive (I) with a p value comprised within the range of from 50 to 1000, according to the directions supplied by the manufacturer (13% by weight). The residual percentage of the mixture is constituted by the antioxidizers described in the patent specification (0.7% by weight) and by an internal lubricant (0.8% by weight).

This mixture is formed into granules and from the granules the A and B specimens are prepared.

The specimens, submitted to the fire performance test, have given the following results:

UL-94: V-0;

LOI: 30.

EXAMPLE 9

The operating procedure is similar to Example 8, using the additive (IIa) of Example 5.

The following results are obtained from the test for fire performance of the specimens:

UL-94: V-0;

LOI: 32.

EXAMPLE 10

The operating procedure is similar to Example 8, the following blends being prepared:

| Polypropylene (Parts by weight) | Additive (IIa) (Parts by weight) | Additive (IIb) (Parts by weight) | LOI |
|---|---|---|---|
| 76.5 | = | 23.5 | 20.2 |
| 76.5 | 7.5 | 16.0 | 32.1 |
| 76.5 | 10.5 | 13.0 | 33.3 |
| 76.5 | 13.0 | 10.5 | 29.4 |
| 76.5 | 16 | 7.5 | 28.0 |
| 76.5 | 23.5 | = | 24.5 |

The polypropylene used contains the antioxidizers and the internal lubricant in the proportions as indicated at Example 6. The additive (I) is the commercial ammonium polyphosphate as reported at Example 8.

The (IIa) additive is the one prepared in the above Example 6. In the Table, the LOI values determined on the specimens prepared from the compositions are reported.

EXAMPLE 11

The operating procedure is similar to that of Example 8, using the additive (IIa) as prepared at Example 5.

The following results are obtained from the tests of fire performance of the specimens:

UL-94: V-0;

LOI: 29.6.

We claim:

1. Self-extinguishing compositions of thermoplastic polymers comprising, in mixture, a thermoplastic polymer and a mixture of additives conferring self-extinguishing characteristics to the same polymer, formed by:

ammonium phosphate or ammonium polyphosphate:

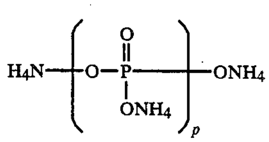

(I)

wherein p varies within the range of from 1 to about 1000;

and by:

phosphorus-containing compounds definable by means of the general formulae:

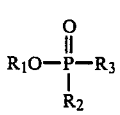

(IIa)

or

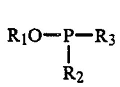

(IIb)

or mixtures thereof or condensation products thereof formed solely from condensation reactions among compounds of formula (IIa), of (IIb) or of (IIa) and (IIb), wherein $R_1$ is a group which is represented by the following formula:

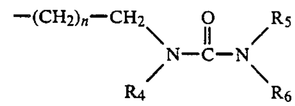

(c)

or a group which is represented by the following formula:

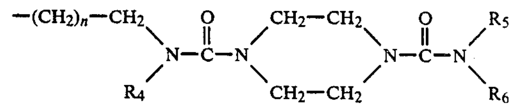

(d)

wherein, in said (c) and (d) formulae: n varies within the range of from 1 to 5; $R_4$, $R_5$, $R_6$ are independently selected among hydrogen (up to a maximum of two hydrogen atoms), $C_2$–$C_6$ alkyl or $C_2$–$C_6$ hydroxyalkylene groups; or $R_5$ and $R_6$, in (c) and (d) formulae, or $R_4$ and $R_6$, limited to (c) formula, when considered jointly, can form a $-(CH_2)_m$alkylene bridge, wherein m has such a value as to give rise to the formation of five-, or sixmembered ring structures or $R_5$ and $R_6$, when considered jointly, can form a $-CH_2-CH_2-O-CH_2-CH_2$ oxydiethylene bridge;

$R_2$ and $R_3$ are the same as $-OR_1$;

or they are selected among the following groups:

$-OH$ $-O^-NH_4^+$

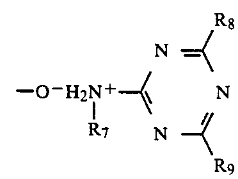

(e)

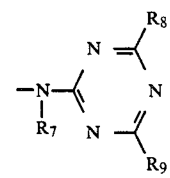

(f)

wherein in said (e) and (f) formulae:

$R_7$ is either hydrogen or a $C_1$–$C_6$ alkyl group;

$R_8$ and $R_9$ are groups independently selected among amino, hydroxy, $C_1$–$C_6$ alkyl, $C_1$–$C_6$ oxyalkyl and mono- and di-amino-$C_1$–$C_6$ alkyl group;

the additives (I) and (IIa) and/or (IIb) can moreover be present in overall amounts of from 20 to 35 parts by weight per each 100 parts by weight of thermoplastic polymer, the weight ratio between additive (I) and addtive (IIa) and/or additive (IIb) can moreover vary within the range of from 0.45/1 to 3.5/1.

2. Compositions according to claim 1, characterized in that the thermoplastic polymer is selected from polyolephinic polymers, acrylonitrile-butadiene-styrene polymers, polyethylene terephthalate, polybutylene terephthalate and polyurethanes.

3. Compositions according to claim 2, characterized in that the said olephinic polymers are polypropylene and low- and high-density polyethylene.

4. Compositions according to claim 1, characterized in that the value of p in the formula of additive (I) varies within the range of from 50 to 1000.

5. Compositions according to claim 1, characterized in that the additives (IIa) and (IIb) are selected among those defined by means of formulae (IIa) and/or (IIb), wherein the substituent $R_1$ is selected from the following groups:

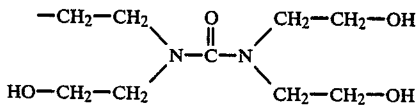

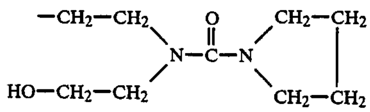

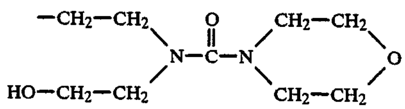

-continued

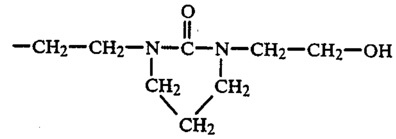

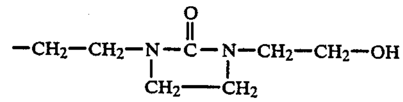

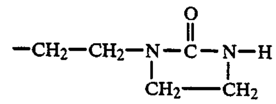

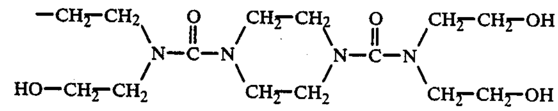

6. Compositions according to claim 1, characterized in that the weight ratio between the additive (I) and the additive (IIa) and/or (IIb) varies within the range of from 0.8/1 to 2.0/1.

7. Compositions according to claim 1, characterized in that they contain the additive (IIa) and/or (IIb) in the form of a condensation product.

* * * * *